United States Patent [19]

Roff

[11] 4,342,329

[45] Aug. 3, 1982

[54] BREATHER VALVE

[76] Inventor: Robert W. Roff, 15B Jetty Rd., Toora, Victoria, Australia

[21] Appl. No.: 181,536

[22] Filed: Aug. 26, 1980

[51] Int. Cl.³ ............................................. F16K 17/26
[52] U.S. Cl. .................................. 137/202; 137/493.9
[58] Field of Search ....................... 137/493.9, 493, 202

[56] References Cited

U.S. PATENT DOCUMENTS

| 2,627,868 | 2/1953 | Runnels | 137/202 X |
| 4,016,904 | 4/1977 | Gordon | 137/493.9 |
| 4,125,126 | 11/1978 | Davis | 137/202 |

FOREIGN PATENT DOCUMENTS 617376  8/1935  Fed. Rep. of Germany ... 137/493.9

Primary Examiner—Alan Cohan
Attorney, Agent, or Firm—Griffin, Branigan & Butler

[57] ABSTRACT

A breather valve for a tank having coaxial flat disc pressure and vacuum relief valves seated on opposite sides of a fitting threaded to a connection on the tank. The outer disc has an axial stem slidably guided by the fitting and the inner disc is slidable on the stem. The discs are commonly biased by a spring between the end of the stem and the inner disc.

6 Claims, 5 Drawing Figures

BREATHER VALVE

BACKGROUND OF THE INVENTION

The present invention relates to a breather valve for a closed liquid tank and relates particularly, although not exclusively to a breather valve for milk, petrol or other liquid containing tankers.

In such tankers it is preferable to have little pressure differential between the ambient air and the air trapped within the tanker. When such a tanker is being filled the displaced air must escape or a large air pressure may build up inside. On opening the upper part of the tank e.g. to insert a "dipstick" for checking the liquid level, the rush of escaping gas from the tank, especially a petrol tank, may result in a serious fire hazard. Similarly when liquid is removed from the tank air should be permitted to enter the tank to prevent a low pressure being developed.

In the past, separate inlet and outlet breather valves have been used in an attempt to overcome such problems. These valves have usually been of the rubber mushroom or mechanical flap type. However it has been found that they can be ineffective to prevent leakage of liquid from the tank when full.

SUMMARY OF THE INVENTION

It is an object of the present invention to overcome, or at least alleviate, such shortcomings.

With this object in view, my invention in one form provides a breather valve for a closed liquid tank, said valve including an outer valve member adapted to co-operate with at least one aperture in said tank or a fitting on said tank, an inner valve member adapted to co-operate with at least one further aperture in said tank or said fitting, and said valve members being resiliently biassed together.

Preferably a float member is adapted to co-operate with said inner valve member to prevent or reduce escape of liquid when said tank is substantially full.

BRIEF DESCRIPTION OF THE DRAWINGS

In order that the invention may be better understood and put into practical effect there will now be described preferred practical embodiments of a breather valve according to the present invention with reference to the accompanying drawings. In the drawings.

DETAILED DESCRIPTION OF THE INVENTION

Figure 1:
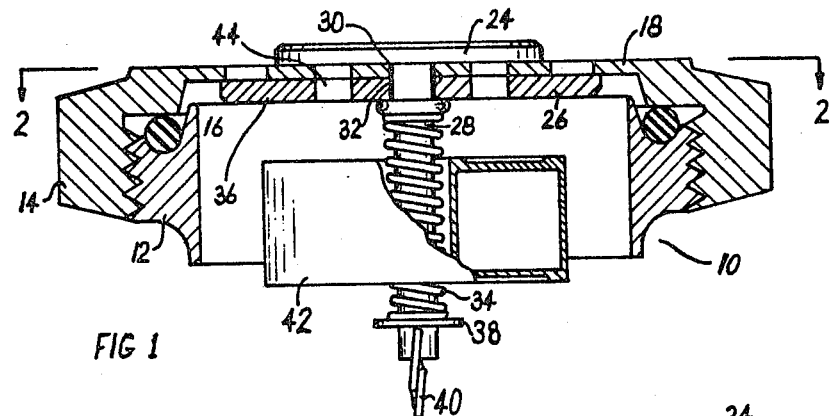
FIG. 1 shows a longitudinal section of a first embodiment of a breather valve made according to the invention.
Figure 3:
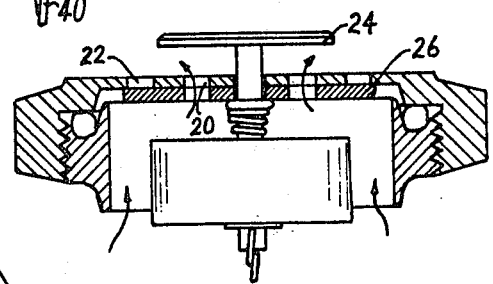
FIG. 3 is a similar view to that of FIG. 1 showing the valve in a first open position.
Figure 2:
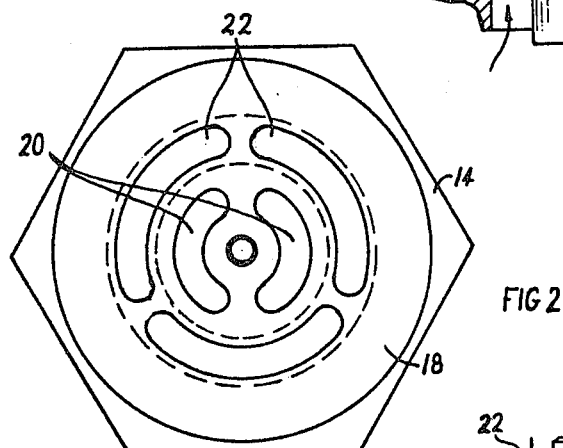
FIG. 2 is a cross-sectional view of FIG. 1 along and in the direction of arrows 2—2.
Figure 4:
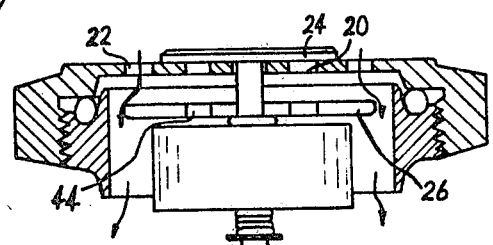
FIG. 4 is a similar view to that of FIG. 3 showing the valve in a second open position.

Reference will now be made to the breather valve 10 shown in FIGS. 1 to 4 of the drawings. The valve is preferably attached to a road tanker by a threaded connection 12 protruding from the tank (not shown). A nut member 14 is screwed onto the threaded connection 12 and is sealingly secured by O-ring 16. On the head 18 of the nut member 14 are two sets of concentric apertures 20 and 22. Overlying these respective apertures are a first disc 24 on the outer face of the head 18 and a second disc 26 on the inside thereof. The outer disc 24 is non-apertured whereas the inner disc 26 has a plurality of apertures 44 adapted to register with the apertures 20 of the inner circle.

A stem 28 is centrally located on the outer disc 24 and enters the head 18 and inner disc 26 through central apertures 30, 32. A spring 34 is coaxially located over the stem 28 between the inner surface 36 of the inner disc 26 and a washer 38 secured by spring clip 40.

A hollow float 42 of diameter sufficient to cover the apertures 20 in the inner disc 26 is located over the spring 34 and is movable between the inner surface 36 of the inner disc and the washer 38.

The operation of the breather valve 10 will now be described. Assuming the tanker to be empty, the float 42 will be resting on the washer 38 and the spring 34 will bias the two discs 24, 26 towards the faces of head 18 so that air cannot enter or leave the tanker. As the tanker is filled the displaced air will increase in pressure and act on the inner surface of the outer disc 24 through the registering apertures 44 of both the inner disc and the inner circle of apertures 20 on the head 18. The pressure will eventually overcome the bias provided by the spring 34 and the outer disc 24 will lift up to allow the displaced air to escape as shown by the arrows in FIG. 3. On reduction of the tanker air pressure the outer disc 24 will resume its seat on the head 18 to prevent further escape of air. This operation will be repeated as and when the tanker air pressure again exceeds the spring bias. As the tanker nears full capacity the float 42 is raised and closes off the inner disc apertures 44 to prevent or substantially prevent the escape of liquid and air.

As liquid is removed from the tanker the air pressure inside tends to drop. The ambient air pressure will act on the inner disc 26 through the apertures 22 to eventually overcome the spring bias and depress the inner disc 26 from the head 18. This will allow air to enter the tanker as shown by the arrows in FIG. 4. The disc will again seat when the inside pressure is substantially equal to the ambient pressure.

Figure 5:
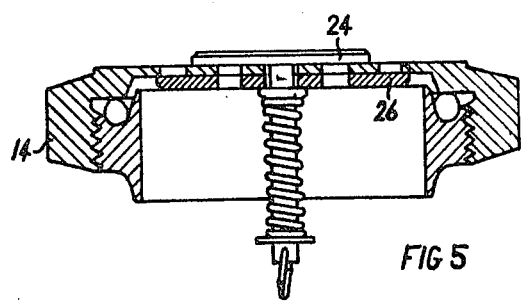
FIG. 5 shows a cross-sectional view of a second embodiment of a breather valve made according to the invention.

FIG. 5 illustrates a second embodiment where the float has been removed. This embodiment operates in the same manner as that shown in FIGS. 1 to 4 and further description is unnecessary.

It will be appreciated that stem 28 could be replaced by a threaded rod and washer 38 by a nut. This substitution would allow an adjustable biassing force to be applied to the disc 24, 26. Additionally sealing members could be placed on the top of float 42 to ensure a seal between the float and inner surface 36. Further, the threaded connection 12 and nut member 14 could be omitted if the apertures 20, 22 were located in the tanker wall. If desired, the disc 24 may be of the same diameter as disc 26. In such cases apertures complementary to apertures 22 would be required.

The invention thus provides a very simple and compact breather valve which allows substantial equalization of the tanker air pressure upon emptying or filling of the tanker, or, depending upon the adjustment e.g. of the spring and/or aggregate areas of the respective sets of apertures, a predetermined pressure differential.

It is to be understood that many modifications may be made in details of design or construction without departing from the ambit of the invention, the nature of which is to be ascertained from the appended claims.

I claim:

1. A breather valve for a closed liquid tank, said liquid tank having a tank wall, said valve comprising:
   an outer valve member shaped as an essentially flat disc and having an axial stem centrally depending therefrom through stem guide means, said stem guide means being formed in said tank wall so that said stem is slidable therethrough along its axis; said outer valve member being adapted to selectively cover and uncover at least a first aperture in said tank wall, said first aperture being concentric with respect to said central stem;
   an inner valve member shaped as an essentially flat disc, said inner valve member having valve member guide means in the plane of said disc facilitating slidable movement of said inner valve member along said axis of said stem, said inner valve member also having in the plane of said disc at least one registering aperture aligned with said first aperture in said tank wall, said inner valve member being adapted to selectively cover and uncover at least a second aperture in said tank wall, said second aperture being concentric with respect to said central stem; and,
   biasing means including a spring held captive between a free end of said stem and an innermost face of said inner valve member to resiliently bias said valve members together.

2. A breather valve for a closed liquid tank, said liquid tank having a tank wall, said valve comprising:
   an outer valve member shaped as an essentially flat disc and having an axial stem centrally depending therefrom through stem guide means, said stem guide means being formed in said tank wall so that said stem is slidable therethrough along its axis; said outer valve member being adapted to selectively cover and uncover at least a first aperture in said tank wall, said first aperture being concentric with respect to said central stem;
   an inner valve member shaped as an essentially flat disc, said inner valve member having valve member guide means in the plane of said disc facilitating the slidable movement of said inner valve member along said axis of said stem, said inner valve member also having in the plane of said disc at least one registering aperture aligned with said first aperture in said tank wall, said inner valve member being adapted to selectively cover and uncover at least a second aperture in said tank wall, said second aperture being concentric with respect to said central stem;
   biasing means including a spring held captive between a free end of said stem and an innermost face of said inner valve member to resiliently bias said valve members together; and,
   a float movable along said stem and adapted to selectively cover and uncover said registering aperture of said inner valve member.

3. A breather valve for a closed liquid tank, said liquid tank having a fitting thereon, said valve comprising:
   an outer valve member shaped as an essentially flat disc and having an axial stem centrally depending therefrom through stem guide means, said stem guide means being formed in said fitting so that said stem is slidable therethrough along its axis; said outer valve member being adapted to selectively cover and uncover at least a first aperture in said fitting, said first aperture being concentric with respect to said central stem;
   an inner valve member shaped as an essentially flat disc, said inner valve member having valve member guide means in the plane of said disc facilitating slidable movement of said inner valve member along said axis of said stem, said inner valve member also having in the plane of said disc at least one registering aperture aligned with said first aperture in said fitting, said inner valve member being adapted to selectively cover and uncover at least a second aperture in said fitting, said second aperture being concentric with respect to said central stem; and,
   biasing means including a spring held captive between a free end of said stem and an innermost face of said inner valve member to resiliently bias said valve members together.

4. A breather valve for a closed liquid tank, said liquid tank having a fitting thereon said valve comprising:
   an outer valve member shaped as an essentially flat disc and having an axial stem centrally depending therefrom through stem guide means, said stem guide means being formed in said fitting so that said stem is slidable therethrough along its axis; said outer valve member being adapted to selectively cover and uncover at least a first aperture in said fitting, said first aperture being concentric with respect to said central stem;
   an outer valve member shaped as an essentially flat disc, said inner member having in the plane of said disc valve member guide means facilitating slidable movement of said inner valve member along said axis of said stem, said inner valve member also having in the plane of said disc at least one registering aperture aligned with said first aperture in said fitting, said inner valve member being adapted to selectively cover and uncover at least a second aperture in said fitting, said second aperture being concentric with respect to said central stem;
   biasing means including a spring held captive between a free end of said stem and an inner most face of said inner valve member to resiliently bias said valve members together; and,
   a float movable along said stem and adapted to selectively cover and uncover said registering aperture of said inner valve member.

5. The breather valve of claims 2 or 4, wherein said float includes a sealing member facilitating abutment of said float with said inner valve member.

6. The breather valve of claims 3 or 4 wherein said fitting comprises a nut-like member adapted to be screwed to a threaded connection on said tank.

* * * * *